INVENTOR
GUSTAV GUANELLA.
BY
ATTORNEY

CROSS TALK COMPENSATION IN PULSE MULTIPLEX SYSTEM

Filed Nov. 9, 1945 5 Sheets-Sheet 2

INVENTOR
GUSTAV GUANELLA.
BY
[signature]
ATTORNEY

INVENTOR
GUSTAV GUANELLA
BY
ATTORNEY

Jan. 1, 1952 G. GUANELLA 2,580,421

CROSS TALK COMPENSATION IN PULSE MULTIPLEX SYSTEM

Filed Nov. 9, 1945 5 Sheets-Sheet 4

INVENTOR
GUSTAV GUANELLA.
BY
ATTORNEY

CROSS TALK COMPENSATION IN PULSE MULTIPLEX SYSTEM

INVENTOR
GUSTAV GUANELLA.
BY [signature]
ATTORNEY

Patented Jan. 1, 1952

2,580,421

UNITED STATES PATENT OFFICE 2,580,421

CROSS-TALK COMPENSATION IN PULSE MULTIPLEX SYSTEM

Gustav Guanella, Zurich, Switzerland, assignor to Radio Patents Corporation, New York, N. Y., a corporation of New York Application November 9, 1945, Serial No. 627,721
In Switzerland December 23, 1944

5 Claims. (Cl. 179—15)

The present invention relates to multiplex signalling according to the so-called pulse modulation method and the main object of the invention is to provide an improved system for and method of signal transmission of this type which is substantially free from mutual interference or cross-talk between the neighboring impulse signal channels.

In multiplex signal transmission of the above character, the modulated pulse signals are impressed successively upon a transmission channel and transmitted in the form of impulses over the same channel. Successive impulses are modulated in accordance with signals, so that for instance the amplitude of the $(m+k.n)$th impulse corresponds to the momentary value of the $m$th signal, $k$ being integers and $n$ being the total number of channels.

A fundamental disadvantage of such systems is due to the fact that unavoidable cross-talk occurs between adjacent or neighboring channels, this being due to the flattening or the distortion of the impulses during transmission.

Further objects and novel aspects of the invention will become more apparent from the following detailed description taken in reference to the accompanying drawings forming part of this specification, and wherein.

Figure 1:
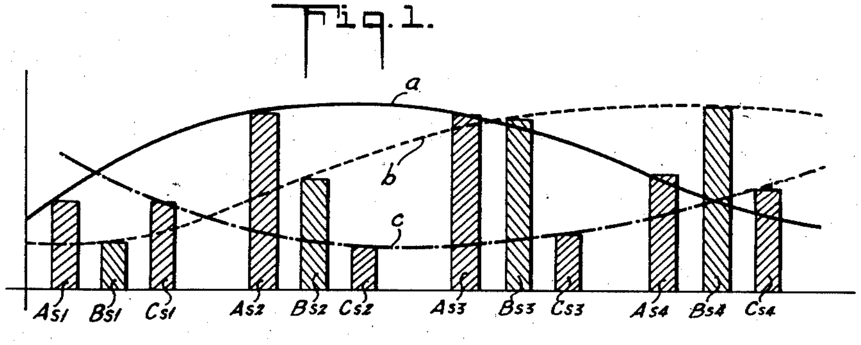
Fig. 1 and Fig. 2 are theoretical diagrams showing the general shape of the signals in a pulse multiplex transmission system before and after transmission through a signalling channel, respectively.
Figure 2:
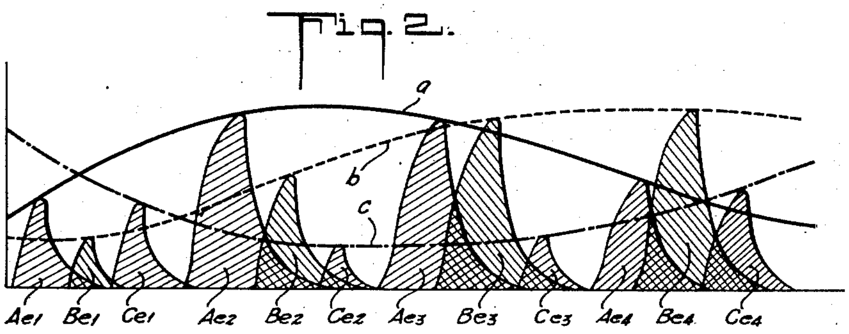

Impulses which are rectangular at the transmitting end as shown in Fig. 1, when transmitted over a long line or cable become deformed due to the different transit times for the various component frequencies as shown in Fig. 2. As a result of the gradual decrease or decay of the impulses, there are considerable residual voltages or currents on the line when the next impulse or even the second next impulse arrives at the receiving end. The residual voltages or also the residual currents, depending upon the resistance conditions, cause undesirable cross-talk in the neighboring channels.

In Fig. 1, illustrating a time-division multiplex signal, impulses $A_s1$, $A_s2$, $A_s3$, etc., correspond to the instantaneous values of signal $a$. Further impulses $B_s$, $C_s$, etc., represent additional signals $b$, $c$, etc., and are modulated in a similar manner. The impulses are transmitted either directly or by a corresponding modulation of a high frequency carrier. Due to amplitude and phase distortion by the transmission elements, the impulses are flattened, that is, each impulse decreases gradually towards the zero line, whereby under certain conditions the sign of the impulse may also change several times. The received signals $A_e$, $B_e$ and $C_e$ are therefore of the kind as shown in Fig. 2. There is a certain amount of over-lapping or the impulses of the first channel have not quite reached zero when the impulse of the next channel occurs, so that there is cross-talk on the succeeding channels. The impulses of unequal amplitude produce distorted impulses due to the frequency-dependent amplitude and phase changes during transmission. The amplitude of these distorted impulses is proportional to the original amplitude, while the shape of the impulses of the differnt amplitudes remains about the same.

Accordingly, the cross-talk factor from the 1st to the 2nd channel is to a great extent constant, and this also applies to the cross-talk factor from the 1st to the 3rd channel and so on. In practice, only the cross-talk on the second or possibly the third channel need be considered. Cross-talk on the more distant channels is hardly noticeable.

Figure 3:
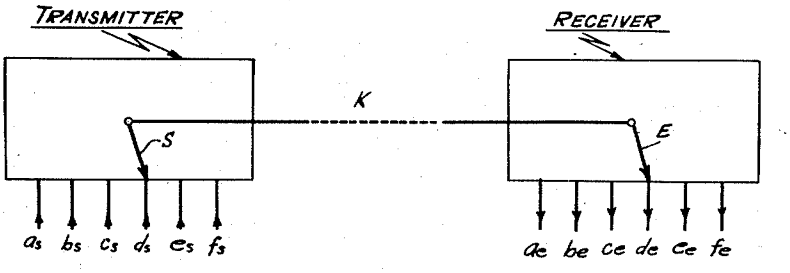
Fig. 3 is a basic block diagram showing the design and operation of a system of this type.

Multiplex signal transmission as shown in Fig. 1 and Fig. 2 may be achieved by means of apparatus basically shown in diagrammatic form in Fig. 3. By means of the transmitting switch S, the six signal channels $a_s$–$f_s$ are connected successively to the common transmission channel K. At the receiving end the synchronously operated receiving switch E serves to effect the desired separation and distribution upon the receiving channel $a_e$–$f_e$. Harmonics which occur as a result of sampling or dividing the signals into impulses may be suppressed by filtering, so that the original signals will be reproduced.

The cross-talk referred to above is reduced according to one embodiment of the invention by means of an arrangement, wherein a coupling of each individual channel with a disturbed channel is provided, in such a manner that at least a partial compensation of the prevailing cross-talk voltages or currents is effected and that the coupling of each channel with the succeeding channel is greater than the coupling in the reverse direction.

Figure 4:
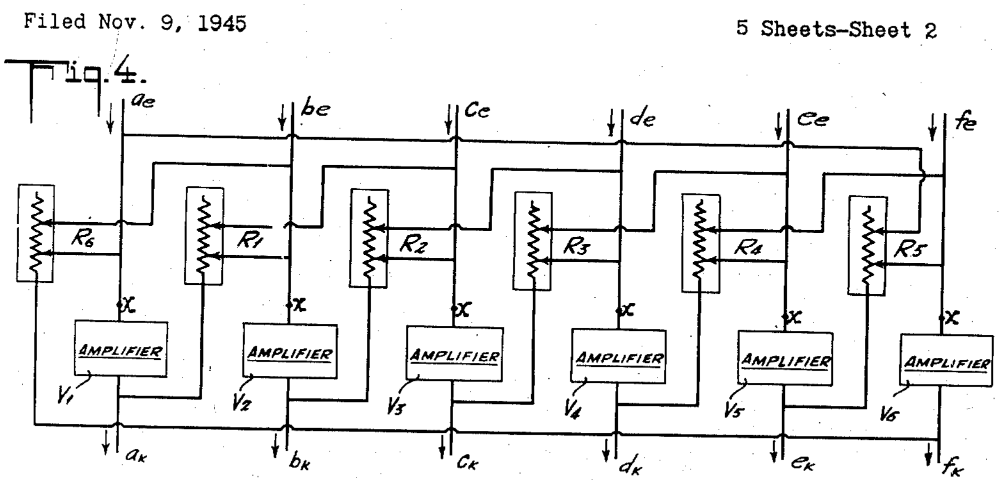
Fig. 4 is a general circuit diagram of a correcting circuit to eliminate cross-talk between neighboring channels in a pulse multiplex system according to the invention.

Fig. 4 shows an arrangement according to the invention arranged at the receiving end of a multiplex communication system. The input conductors $a_e$–$f_e$ are connected to a receiving distributor such as shown in Fig. 3. The corresponding output channels are indicated at $a_k$–$f_k$, respectively. Although the signals in the input conductors are still affected by cross-talk disturbances, they are to a great extent free from such disturbances after passing through the compensating apparatus. In each channel there is inserted an amplifier $V_1$–$V_6$, respectively, all having the same electrical characteristics. Each channel is coupled with the next channel, and if necessary with the second next channel, and so on.

These coupling may consist of damping devices, such as of ohmic resistors or potential dividers $R_1$ to $R_6$ having one or two tap connections as shown in the drawing. These resistors are so arranged that they effect a coupling between the output of one amplifier and the input of the next amplifier. Thus, the output voltage of the first amplifier $V_1$ is applied through adjustable attenuation or damping elements, such as resistance $R_1$, to the input of the amplifier of the second channel and furthermore, after a corresponding greater attenuation, to the input of the amplifier of the third channel. The tap points of potentiometer $R_1$ are so adjusted that the cross-talk caused by the flattening of the impulses and occurring in the second and third channel is just compensated. Potentiometers $R_2$–$R_6$ which are similarly adjusted serve for a corresponding suppression of the cross-talk on the other channels. According to the conditions of distortion of the impulses and the desired reduction in cross-talk, each potentiometer corrects more or less channels.

As is understood, adequate suppression of undesirable additional couplings between the channels will be necessary. Thus for example, it is to be noted that an undesirable coupling between channels $a$ and $b$ may occur through potentiometer $R_6$. These couplings may, however, be avoided by the use of fork or bridge circuits or by using damping resistances $R_1$–$R_6$ which are large compared with the impedance of the line, or the compensation may be adjusted for this purpose. A reverse coupling of channel $b$ with channel $a$ over $R_1$ is avoided in the arrangement shown by the amplifier $V_1$. The same applies to all the other channels in an analogous manner. Amplifiers may also be provided at the input ends of the potentiometers. Thus, by means of an amplifier in front of potentiometer $R_1$ a coupling from channel $b$ to channel $a$ is prevented. In this case the channel amplifiers $V_1$–$V_6$ may be omitted or damping resistors may be provided in their place.

In order to prevent coupling from $V_1$ to $V_2$ during the impulse period of $A_e$ and likewise from $V_2$ to $V_3$, $V_3$ to $V_4$, etc., during the corresponding following impulse periods, the channel switching (see switch E in Fig. 3) is advantageously effected close to the amplifier inputs, that is, at the points marked X on the drawing. In this manner, all amplifiers are disconnected except one assigned to the impulse being received, whereby undesirable transfer of signals to the next or second next amplifier is substantially prevented.

Figures 5, 6:
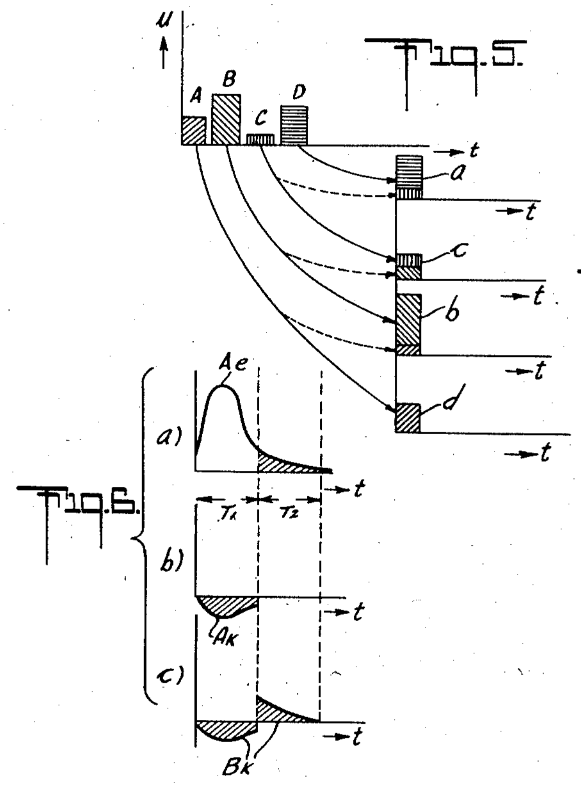
Fig. 5 and Fig. 6 are theoretical diagrams explanatory of the function and operation of the circuit according to Fig. 4.

The function and operation of the circuit according to Fig. 4 will be further understood from the following with reference to the theoretical diagrams shown in Figs. 5 and 6. An essential feature of the invention resides in the fact that the flattening of the pulses as shown in Fig. 2 results in a cross-talk factor which is independent of both the pulse amplitude as well as the channel number, i. e. the amount of cross-talk from the first to the second channel is substantially the same as the cross-talk from the second to the third channel, etc. The independence of the cross-talk factor of the pulse amplitude is due to the geometrical similarity of the distorted impulses for different initial amplitudes, which in turn is due to the fact that the flattening is caused substantially by linear distortion in the form of phase or delay distortion during transmission. This makes it possible to use linear compensating devices providing a constant ratio of artificial or compensating cross-talk of opposite polarity in accordance with the invention.

Figure 12:
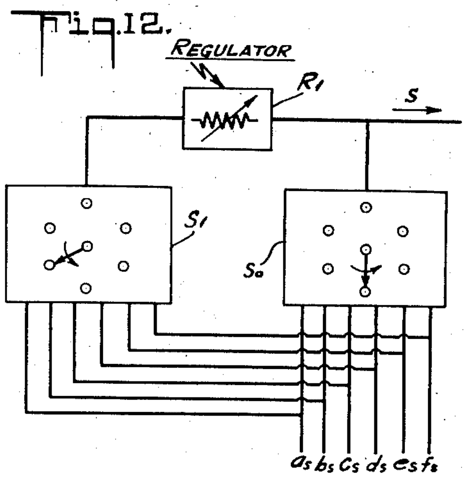

Referring to Fig. 5, items A, B, C and D represent the successive signal pulses of a pulse multiplex signal $u$. By means of the switching device or receiving distributor E, the pulses A, B, C and D are applied in succession to the various signal channels $a$, $b$, $c$ and $d$, respectively, in such a manner that the pulse voltages in each channel are proportional to the respective instantaneous signal amplitude. According to the present invention, there is produced an additional influence of pulse A upon the signal channel $b$ and of the pulse B upon the signal channel $c$, etc., as indicated by the full and dotted lines in Fig. 5. As a result, the received signal in channel $b$ will be dependent upon the amplitudes of both the pulses A and B. Vice versa, in case of a transmitter as shown in Fig. 12, the transmitting pulse A will be determined by the two signals $a$ and $b$.

Referring to Fig. 6, let it be assumed that the channel $b$ in Fig. 4 is free, i. e. that no signal is being transmitted through this channel. In this case channel $b$ will be affected only by the trailing end of the received impulse $A_e$ originating from the channel $a$ and encroaching upon the next channel provided for the impulse $B_e$ as indicated by the cross-hatched area in Fig. 6*a*. In the latter, the two pulse channels comprising the time periods $T_1$ and $T_2$ are assumed to be closely adjacent although they may be separated by a spacing interval in the manner shown in Fig. 1. The cross-hatched portion of the impulse $A_e$ represents the undesirable cross-talk in the channel *b*, as is understood. This cross-talk is suppressed or compensated in accordance with the invention by producing a compensating pulse $A_k$ as shown in Fig. 6*b*, said compensating impulse being derived from the channel *a* at reduced amplitude and with reversed polarity by means of the amplifier $V_1$ and the adjustable attenuator $R_1$ connected between the output of the amplifier $V_1$ of channel *a* and the input of the amplifier $V_2$ of channel *b*. There is obtained in this manner at the output of the amplifier $V_2$ a signal composed of the sum of the signals shown in cross-hatching in Figs. 6*a* and 6*b*, this resultant or compensated signal $B_k$ being shown in Fig. 6*c*. The attenuator $R_1$ is so adjusted that the areas of the two cross-hatched portions of Fig. 6*c* are equal, i. e. that the signal $B_k$ has a mean value equal to zero. If this signal is then passed through a low-pass filter for removing harmonics and reproducing the original low frequency signal in the usual demodulator circuits, any output voltage or current of the receiver due to the signal $B_k$ will disappear and cross-talk from the channel *a* upon the corrected or compensated channel *b* will be substantially eliminated. In the same manner, compensation may be effected between channels *b* and *c*, etc., as well as between channels *a* and *c*, as will be readily understood.

Although in Fig. 6*c*, the undesirable and compensating cross-talk pulses $B_k$ occur in succession, they will substantially cancel upon passing through a low-pass filter on account of their short duration (exaggerated in the drawing for ease of illustration), since the effect of the filter will be to flatten or substantially lengthen both impulses over a period substantially longer than the impulse length, in such a manner that the flattened impulses will be substantialy overlapping and neutralize each other in the final output circuit of the receiver.

Figure 7:
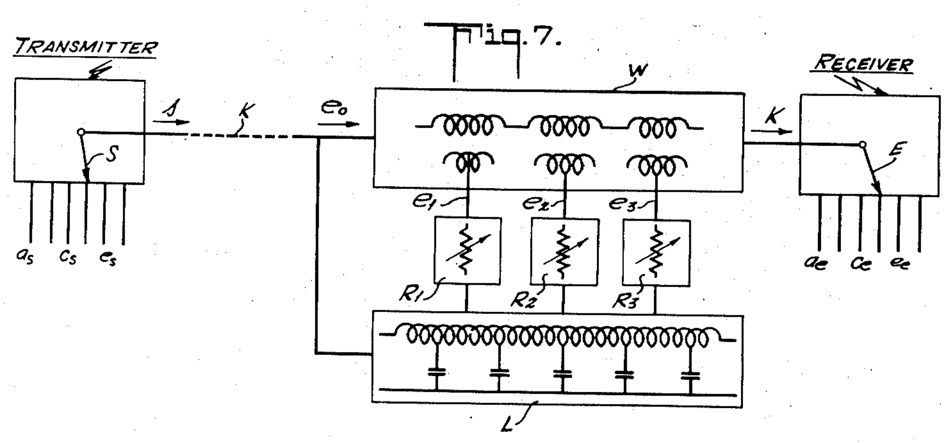
Fig. 7 is a basic diagram of an alternative method of cross-talk compensation according to the invention.

Cross-talk may also be compensated according to another embodiment of the invention by means of a device which is located in the common transmission channel K of all impulses, as shown in Fig. 7. In the latter, correction signals which are displaced in time are obtained by a corresponding retardation ofthe impulses which are to be corrected. S and E again indicate the synchronously-operated change-over switches or commutators at the transmitting and receiving end respectively. The delay device L may consist of an artificial line and is provided with tap points from which the compensation signals are obtained with a time delay relative to the input signal $e_0$ of at least approximately once, twice, etc. an impulse period. The amplitudes of these voltages may be adjusted by means of potentiometers $R_1$, $R_2$, etc., so that correction impulse voltages $e_1$, $e_2$, etc., are formed which are unequally retarded relative to voltage $e_0$. These correction voltages are added to the receiving voltage $e_0$ in the coupling device W by means of individual coupling transformers, so that a resultant corrected voltage $k=e_0+e_1+e_2+ \ldots$ is obtained.

Accordingly, a receiving impulse $e_1$ with reduced amplitude may occur at the output of potentiometer $R_1$, when impulse $B_{e1}$ which follows impulse $A_{e1}$ appears in the receiving voltage $e_0$. Receiving impulse $B_{e1}$ may thus be corrected by an adjustable fraction of $A_{e1}$. This correction is obtained by a suitable adjustment of $R_1$ in such a manner that that part of the impulse $A_{e1}$ which is fattened by the transmission and affects the impulse $B_{e1}$ is completely compensated, in the manner described. When the damping conditions require it, adjustable amplifiers may be substituted for the damping elements or a common amplifier may be located at the input end of the artificial line. The sign and amplitude of the correction voltage $e_1$ should be so adjusted, depending upon the transmission means employed, that there is no more cross-talk from the first to the second channel. Cross-talk from the second to the third channel etc., is also avoided because the cross-talk factors of neighboring channels are generally equal. In a similar manner, cross-talk between the first impulse channel to the third or fourth impulse channel may be compensated by the correction voltages $e_2$ and $e_3$, whose amplitude and sign are adjusted according to the transmission conditions. When $e_2$ is regulated by the potentiometer $R_2$, any additional cross-talk from the first to the third channel resulting from the correction voltage $e_1$ is also taken into account.

Figure 8:
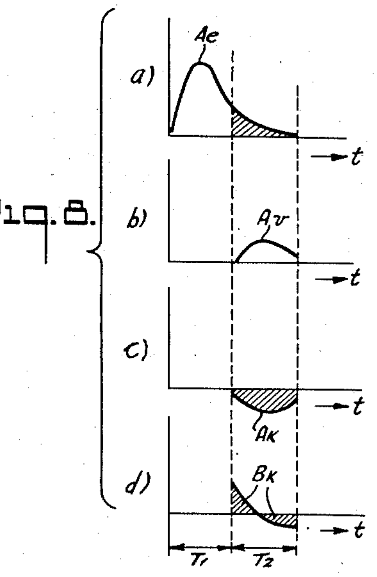
Fig. 8 is a theoretical diagram explanatory of the function of the circuit according to Fig. 7.

The function of Fig. 7 will be further understood from the following with reference to the theoretical diagram shown in Fig. 8. Assuming again that no signals are being transmitted through the pulse channel *b*, the trailing portion of the signal pulse $A_e$ shown in cross-hatching, Fig. 8*a*, will again be impressed upon the channel *b*, whereby to cause undesirable cross-talk in the manner pointed out. In accordance with Fig. 7, there is derived from the receiving pulse $A_e$ a delayed pulse $A_v$ having an amplitude $e_1$ as shown in Fig. 8*b*. By means of the coupling arrangement W, this correcting impulse voltage is applied, with reversed polarity upon the received signal $e_0$, whereby an additional pulse $A_k$, Fig. 8*c*, will occur in the compensated transmitting circuit K. This signal is applied, by way of the distributor E, simultaneously with the undesirable trailing portion of the pulse $A_e$, upon the pulse channel *b*. In the latter, therefore, a resultant signal $B_k$, Fig. 8*d*, will occur which is composed of the sum of the signals represented by the cross-hatched portions of Figs. 8*a* and 8*c*, respectively. Again, the resistor $R_1$ is so adjusted that the positive and negative areas of $B_k$ are equal. As a result, signal $B_k$ will be substantially suppressed by the filtering action in a subsequent demodulator, since it contains no appreciable direct current component and is composed substantially of components of higher frequencies. In an analogous manner, cross-talk upon a third channel may be suppressed by producing correcting impulses delayed by intervals of twice the spacing intervals between successive impulses, in the manner shown in Fig. 7.

When using a system according to the invention in practice, it may be expedient to provide correction devices shown in Figs. 4 or 7 additionally or exclusively at the transmitting end. The decoupling arrangement shown in Fig. 4 may be made up of a corresponding coupling of transmission channels $a_3$, $b_s$, etc. The correction arrangement shown in Fig. 7 may simply be located at the transmitting end in front of the transmission channel K. With very long transmission channels it may be advisable to distribute two or more of the correction devices shown in Fig. 7 along the transmission channel with at least one device at the transmitting end.

The described impulse correction may also be achieved if the transmission channel is utilized in both directions of transmission. With the arrangement shown in Fig. 7, the corrected voltages $e_1$, $e_2$, etc., have to be supplied to the main channel in such a manner that the same corrected voltage flows in both directions along the line. This can for instance be accomplished if potentiometers $R_1$, $R_2$, etc., as seen from the output end, are given a high ohmic internal resistance, the output terminals of these potentiometers being connected in parallel with the line.

Figure 9:
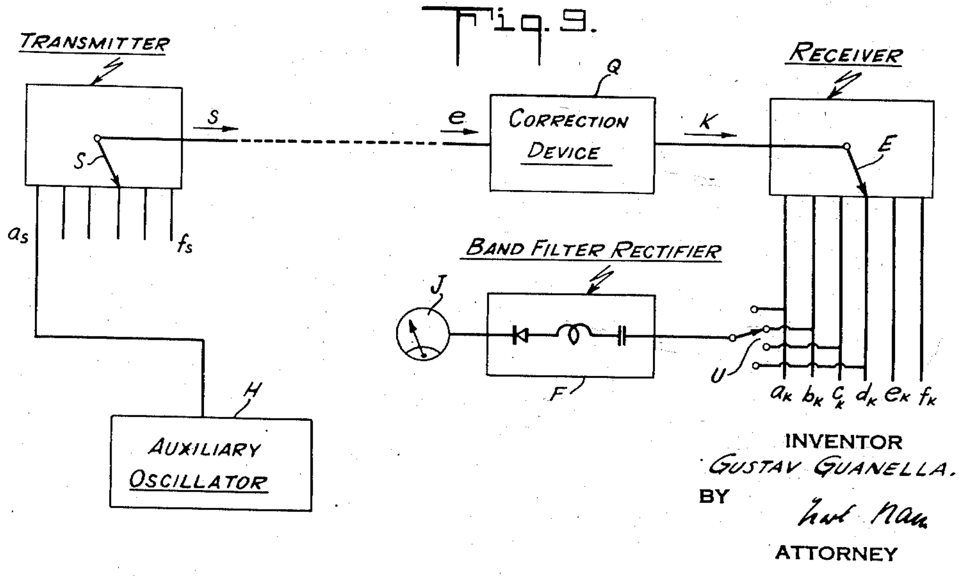
Fig. 9 shows in diagrammatic form a transmission system according to the invention, with means for adjusting the cross-talk compensating device.

In order to adjust the described coupling means to suit a given transmission channel, such as the first channel $a$, a control tone may be sent over this channel. In the arrangement shown in Fig. 9, this control tone is produced by means of an auxiliary oscillator H. At the receiving end, this same tone is filtered out by means of a filter F and after rectification serves to energize an instrument J. Change-over switch U enables the individual channels $a_k$, $b_k$, $c_k$, etc., to be adjusted in the same manner. The correction device Q, which may consist of an arrangement shown in Fig. 7, is so adjusted that the control tone is no longer heard in the channels $b_k$, $c_k$, etc.; that is to say, that instrument J does not show any deflection of its pointer if connected to the respective channels.

Figure 10:
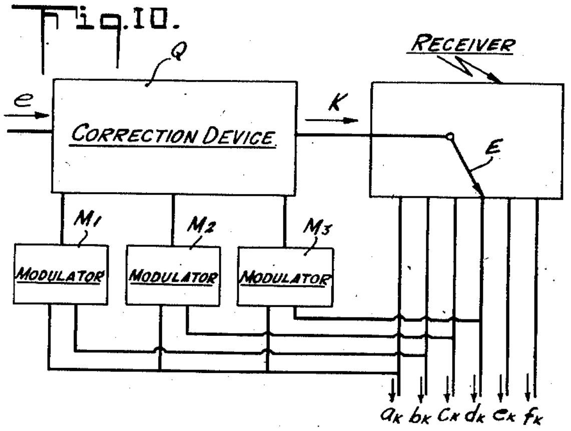
Fig. 10 is a diagram showing an alternative method of adjusting the cross-talk compensation.

An even simpler adjustment of the compensating voltage shown may be obtained by an arrangement in Fig. 10. In this case, the signals occurring in channels $b_k$, $c_k$, etc., are compared with those of channel $a_k$ by means of a product-forming method. When cross-talk occurs from channel $a$ to channel $b$, the control tone appears with a diminished amplitude also in channel $b_k$, so that by forming the product with the original sinusoidal voltage of channel $a_k$ by means of modulator $M_1$, a modulation product $m_1$ results which corresponds to the cross-talk factor in magnitude and sign.

Assuming the cross-talk factor from the first to the second channel to be $g_{12}$, then the control tone $h=h_0.\sin w_0t$ of the first channel produces, after transmission, the sinusoidal tone $g_{12}.h_0.\sin w_0t$ in the second receiving channel $b_k$. The modulation product in $M_1$ is then $$m_1=g_{12}.h_0^2.\sin^2(w_0t)=\tfrac{1}{2}g_{12}h_0^2-\tfrac{1}{2}g_{12}.h_0^2\cos(2w_0t)$$

wherein the frequency-independent term $\tfrac{1}{2}g_{12}.h_0^2$ represents the direct current component. This part can be segregated from the modulator by a low-pass filter and is a measure of the cross-talk factor $g_{12}$. This direct current part is then used to control the adjustment of a correction device Q. When making the adjustment, the direct current component of $m_1$ is caused to disappear. In a similar manner, it is easy to control cross-talk from the first to the third and fourth channels by means of a corresponding product formation in modulators $M_2$, $M_3$. The modulators may be of the ring or any other type known in the art.

Products $m_1$, $m_2$, etc., may easily be indicated by means of suitable instruments. When automatic devices are provided, these products may also be used to readjust the regulating elements of device Q so as to obtain as great a reduction in cross-talk as possible. Devices $M_1$, $M_2$, etc., may also be electro-mechanical product forming systems such as wattmeters whose pointer deflections are proportional to the average product of their input voltages. In this case, indication or automatic regulation occurs directly in dependence on the mechanical deflections of these instruments.

Complete suppression of cross-talk is in many cases possible only when the phase position of the additional signals used for compensation is correctly adjusted. With the arrangement shown in Fig. 4 it is possible for this purpose to derive the correction voltages from potentiometers $R_1$ . . . $R_6$ by way of phase rotating circuits located between the potentiometer tap points and the amplifier input circuit.

The commutators or change-over devices S and E in Figs. 3, 7, 9 and 10 may consist of cathode ray switch tubes in which the electron ray is deflected and passes over a number of uniformly distributed electrodes connected to the various channels. The correction according to the invention may also be effected directly with the aid of cathode ray tubes, if the electrodes at the transmitting or receiving end or at both are composed of individual segments which are associated with successive channels. With such a receiving change-over tube it is possible to arrange at least one additional segment adjacent to the main anode segments leading to the individual receiving channels, said additional segment leading to the next receiving channels. Thus for instance, inside or outside the third anode segment leading to the third receiving channel, at least one smaller segment is provided which is connected with the fourth and fifth receiving channel, respectively, through an appropriate damping device. For each position of the controlled electron beam the corresponding receiving channel will be excited, while at the same time the next channel or the second next channel receives a correspondingly dimensioned correction voltage. Such a system is shown more clearly in Fig. 16 to be described later.

Figure 11:
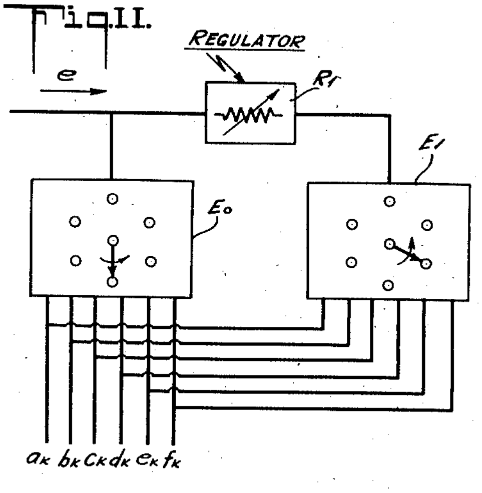
Fig. 11 and Fig. 12 are block diagrams illustrating further methods of carrying out the invention.

Cross-talk may also be suppressed by means of an arrangement such as is shown in Fig. 11, wherein for switching-over the channels at the receiving end two switches $E_0$ and $E_1$ are provided. The switching position of these switches always differs by one channel interval so that switch $E_1$ is always in advance of switch $E_0$ by one switch position. By means of switch $E_1$, the impulses of each preceding channel may thus be supplied to the individual receiving channels with adjustable amplitude, so that cross-talk between neighboring channels will be compensated. With further synchronously-operated receiving switches having a correspondingly greater lead and adjustable coupling elements, cross-talk between channels which are further apart may also be compensated. In the example shown cross-talk between neighboring channels is regulated by the attenuator $R_1$. In this case it is also advantageous to employ cathode ray tubes as switching devices.

Figure 13:
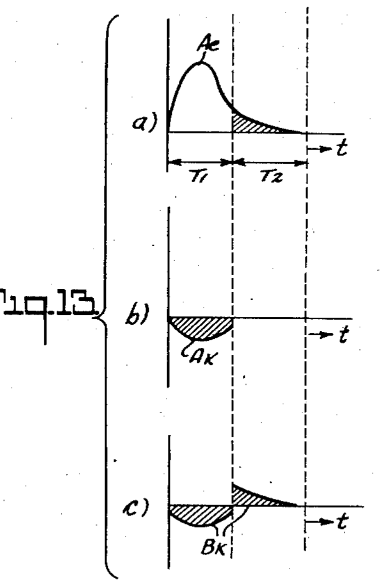
Fig. 13 and Fig. 14 are theoretical diagrams explanatory of the function and operation of the arrangements shown in Figs. 11 and 12, respectively.

The function of Fig. 11 will be further understood from the following by reference to the theoretical diagrams shown in Fig. 13. Assuming again that no signal is transmitted through the channel $b$ and that the incoming multiplex signal includes a flattened signal pulse. The received pulse $A_e$, Fig. 13$a$, in addition to passing through the channel $a$ is additionally applied by way of the coupling resistor $R_1$ and the auxiliary distributor $E_1$ upon the channel $b$ at reduced amplitude and in opposite polarity relation, as indicated at $A_k$ in Fig. 13$b$. Accordingly, the compensated channel $b_k$ of Fig. 11 will receive a resultant signal $B_k$, Fig. 13*c*, composed of the sum of the signals as indicated by cross-hatching in Figs. 13*a* and 13*b*, respectively. By proper adjustment of the coupling resistor $R_1$, the negative and positive areas of $B_k$ may again be equalized and cross-talk in the channel *b* originating from channel *a* eliminated in substantially the same manner as in the previous illustrations.

These arrangements may of course also be provided at the transmitting end. A corresponding apparatus is shown in Fig. 12 wherein the phases of the change-over devices $S_1$ and $S_0$ again differ by one pulse interval in the same manner as in Fig. 11. The incoming signal conductors are indicated by $a_s$, $b_s$ . . . $f_s$, while the arrow S indicates the direction of the transmitted signals.

Figure 14:
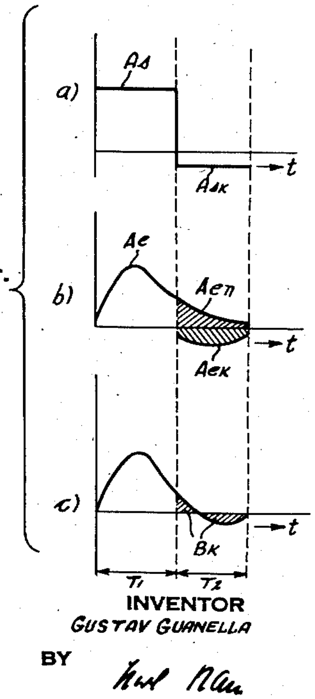

The function and operation of Fig. 12 will be further understood from the following with reference to the theoretical diagram shown in Fig. 14. Assuming again that no signal is transmitted through the channel *b*, a transmitting impulse $A_s$, Fig. 14*a*, will be applied to the transmission medium or circuits by means of the transmitting distributor $S_0$. At this point, the transmitting impulse $A_s$ is not yet distorted, as shown in the drawing. The auxiliary distributor $S_1$ serves to connect the channel *a* during the next time interval to the transmitting circuit by way of the coupling resistor $R_1$ and with reversed polarity, in such a manner that an additional negative compensating impulse $A_{sk}$ will occur in the second channel. After transmission, the signal pulse $A_s$ as well as the correcting pulse $A_{sk}$ will appear as receiving pulses $A_e$ and $A_{ek}$ having a distorted or flattened shape due to the phase or delay distortion during the transmission, as shown at $A_{en}$ and $A_{ek}$ in Fig. 14*b*. As a result, the cross-hatched signal $B_k$ will be applied through the receiving distributor E to the receiving channel *b*. Thus again, cross-talk will be eliminated by equalizing the positive and negative cross-hatched areas of the signal $B_k$ by proper adjustment of the attenuator $R_1$, in a manner readily understood from the foregoing.

The switching devices shown in Figs. 10 and 12 rotating with different switch positions may consist for instance of a cathode ray tube with circular deflection. In such a tube, at least two concentric electrode circles are provided, the electrodes being mutually staggered. The electrodes of different circles which come into operation simultaneously are connected to individual channels the sequence numbers of which differ from each other by constant amounts.

In order that cross-talk does not increase appreciably when slight deviations in switching occur at the transmitting and receiving ends, it is necessary that the adjustment of the delay for the correction signals should be such that small phase deviations in the synchronous operation of the change-over switches at both ends are permissible. With the arrangement shown in Fig. 7, this is for instance achieved by displacing the tap points so as to produce such a delay that the correction voltage is only allowed to act on the line after passing its maximum value. Thus, if for instance the synchronous switch E has a slight lead and cross-talk increases slightly, then a slightly higher instantaneous voltage is taken from the impulse which passes the transmission element so that the compensation remains at least practically constant.

Figure 15:
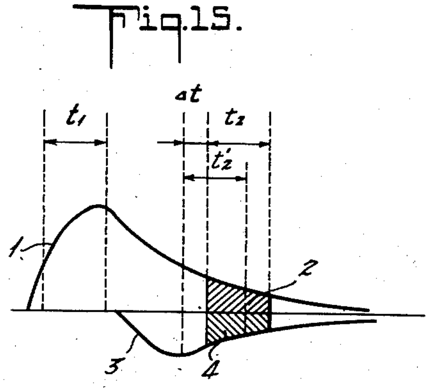
Fig. 15 is a graph illustrating a preferred adjustment of the compensation device to insure efficient cross-talk compensation, irrespective of slight deviations from the synchronism between the transmitting and receiving devices.

Fig. 15 illustrates this operation graphically. 1 is an impulse and $t_1$ its transit time in the associated channel. The opening time of the succeeding neighboring channel when the receiving switch operates in synchronism is $t_2$. The cross-talk voltage caused by the first impulse is indicated by the area 2. This voltage is compensated by the equally large part 4 of impulse 3 which passes through the retarding device. If the switch operates somewhat prematurely, such as during the time $t_2'$ being at an instant earlier by the interval $\Delta t$, then the voltage which passes is somewhat larger, because the retarded impulse portion also increases in the same ratio, so that the compensation remains practically constant.

All arrangements for suppressing cross-talk from one channel to the next channel or to the second next channel, generally have the same adjustment. The result of this is that the coupling of the *m*th channel with the $(m+a)$th channel is equal to the coupling of the $(m+k)$th channel with the $(m+k+a)$th channel, *a* representing a series of whole numbers.

Figure 16:
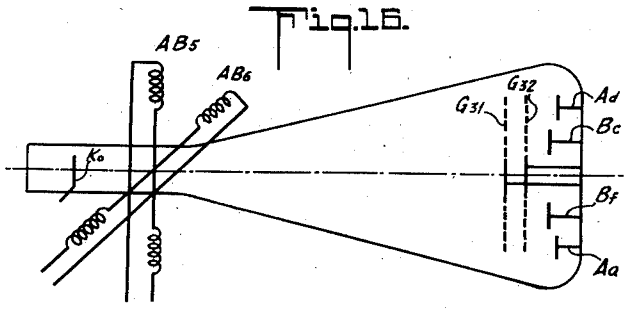
Fig. 16 and Fig. 17 are, respectively, longitudinal and end views of a preferred cathode ray tube switch or commutator suitable for use in connection with the invention.
Figure 17:
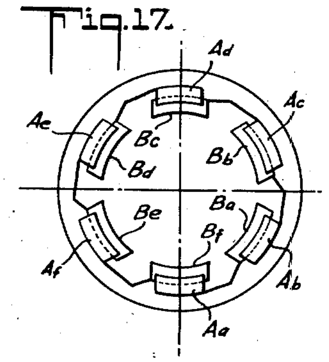

Referring to Figs. 16 and 17, there is shown a cathode ray commutator especially suited for cross-talk compensation as previously described. The tube shown having a cathode $K_0$ or equivalent electron gun system includes an annular-shaped acceleration grid $G_{31}$ and a deceleration grid $G_{32}$ located near the end of the tube opposite to the cathode and disposed substantially concentrically to the tube axis or the electron ray in the normal undeflected position. The main anodes $B_a$, $B_b$ . . . $B_f$ are arranged in circular fashion in such a manner as to be impinged in succession by the rotating electron ray. In addition to the main anodes, there are shown additional or auxiliary anodes $A_a$, $A_b$ . . . $A_f$ arranged so as to be also impinged by the rotating cathode ray.

Fig. 17 shows more clearly the arrangement of the main and auxiliary anodes partly overlapping each other in the manner illustrated. The cathode ray is deflected in such a manner as to sweep over the anodes in counter-clockwise direction and in such a manner that a substantially greater amount of current is impinged upon the main anodes $B_a$ . . . $B_f$ and only a small fraction of current is impinged upon the secondary anodes $A_a$ . . . $A_f$. The rotation of the electron B may be effected in a known manner such as by a pair of deflecting coil systems $AB_5$ and $AB_6$ arranged with their axes at a right angle and energized by alternating deflecting voltages having a quadrature phase angle with respect to each other.

The coordinated main and secondary anodes $A_a$, $B_a$, etc., are so connected with each other through suitable conductors that during the instant of current flow to the main anode $B_a$, an additional current is impressed upon the main anode $B_b$ by way of the secondary anode $A_b$. This shunt current serves to compensate the cross-talk currents transmitted from the first to the second impulse channel as a result of impulse distortion. In the example shown, the correcting currents are of the same sign as the main current. In this connection it has been assumed that the undesired cross-talk currents are of the opposite signs compared with the original currents, that is, each positive transmission impulse results in a disturbing voltage of opposite sign due to transmission distortion, which disturbing voltage will occur at the receiver after lapse of a time interval following the main impulse equal to an impulse period. Such a reversal in sign is found to occur in most practical cases of impulse transmission.

Figure 18:
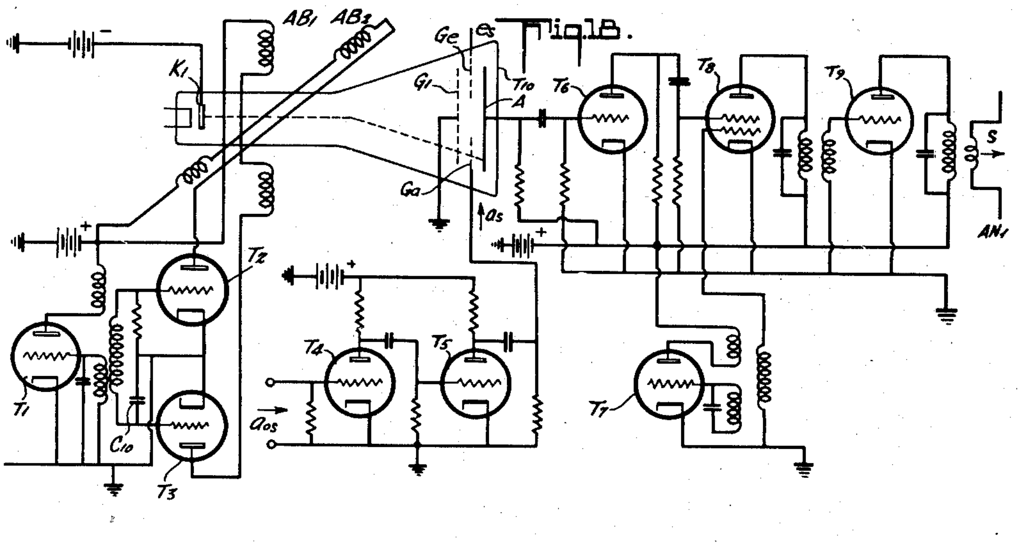
Fig. 18 and Fig. 19 show a complete transmitting and receiving circuit, respectively, of a pulse multiplex system comprising cross-talk compensation of the type according to the invention.
Figure 19:
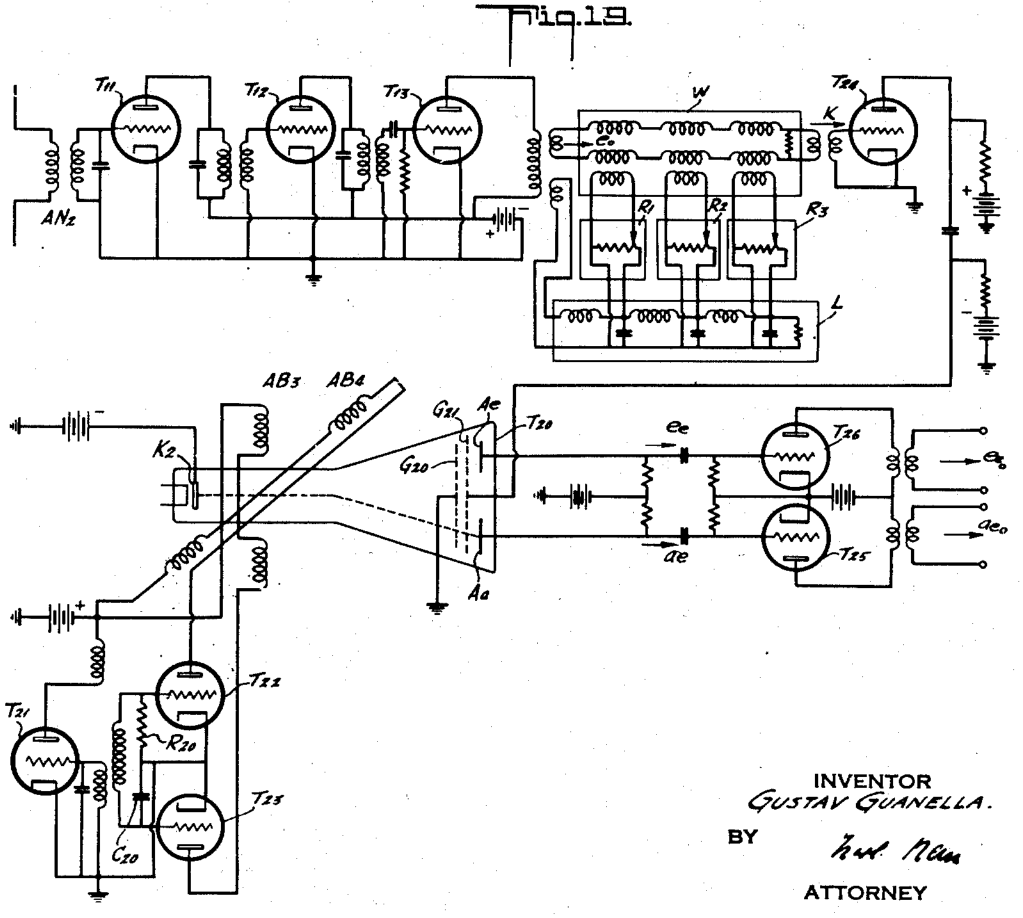

Referring to Figs. 18 and 19, there are shown the complete circuit diagrams for the transmitter and receiver of an impulse signal transmission system embodying a cross-talk compensation device according to the invention of the type shown in Fig. 7. The synchronously operated switching devices at the transmitter and receiver are shown in the form of cathode ray tubes, tube $T_{10}$ constituting the transmitting switch and tube $T_{20}$ being the receiving switch. The transmitting tube $T_{10}$ includes a cathode $K_1$, a disc-shaped acceleration grid $G_1$, and a plurality of circularly disposed control grids of which the lower grid $G_a$ and the upper grid $G_e$ are shown in the drawing. Item A is a common disc-shaped anode. The electron ray produced by the cathode or an equivalent electron gun is deflected by the deflecting coil systems $AB_1$ and $AB_2$ so as to move along a circular trace and to pass through the several control grids in succession before impingement upon the anode A. By the action of these control grids, the electron current impinged upon the anode A is varied in accordance with the control voltage of the various impulse channels.

The deflection voltages for the cathode ray are produced by the regenerative triode oscillator $T_1$ and amplified by the amplifiers $T_2$ and $T_3$ before being applied to the deflection coils $AB_1$ and $AB_2$, respectively. In order to obtain a continuous rotation of the cathode ray, it is necessary that the deflection currents are in quadrature or are displaced in phase by 90°. For this purpose, there is provided an ohmic resistance $R_{10}$ and a capacity $C_{10}$ in the grid circuits of the triode amplifiers $T_2$ and $T_3$, respectively.

The low frequency signal $a_{0s}$ of the first channel is amplified in the example shown by the triode amplifiers $T_4$ and $T_5$ to produce a control voltage $a_s$ applied to the first control grid $G_a$ of the cathode ray switch $T_{10}$. In a similar manner, the remaining signal control voltages are applied to the other control grids of the tube. The impulses produced at the anode A which have amplitudes proportional to the signal voltages of the various channels, are amplified in the triode amplifier $T_6$ and applied from the latter to the mixer or modulator $T_8$ for modulating a high frequency carrier generated by a regenerative triode oscillator $T_7$. in the manner shown and well understood. The thus obtained high frequency impulses modulated in accordance with the signal impulses are applied to a transmitting antenna $AN_1$ after further amplification by the power amplifier $T_9$.

At the receiver shown in Fig. 19, the high frequency impulses received by the antenna $AN_2$ are amplified by the triode amplifiers $T_{11}$ and $T_{12}$ and demodulated in the rectifier stage $T_{13}$. The thus obtained signal impulses $e_0$ are then applied to the receiving apparatus after passing through the distortion correction device W for separation into or distribution upon their individual signalling channels. The receiving apparatus shown includes a further amplifier stage $T_{24}$ through which the impulse voltage $k$ is applied to the circular shaped control grid $G_{21}$ of the cathode ray receiving switch $T_{20}$. The latter again comprises a cathode $K_2$ and a pair of crossed deflection coil systems $AB_3$ and $AB_4$ to effect a rotation of the cathode ray in exactly the same manner and in synchronism with the cathode ray of switch tube $T_{10}$ at the transmitter. The deflection voltages are again supplied by a triode oscillator $T_{21}$ and amplified by amplifiers $T_{22}$ and $T_{23}$ provided with a grid circuit resistance 20 and condenser, respectively, to effect a 90° phase shift in substantially the same manner as shown in Fig. 18.

As pointed out, the receiving deflection voltage generator $T_{21}$ is operated in synchronism with the transmitting deflection voltage generator $T_1$, whereby the electron rays of both cathode ray switches rotate in exact relative phase position or synchronism with each other. The cathode ray switch $T_{20}$ at the receiver, furthermore, includes a circular acceleration grid $G_{20}$, a deceleration grid $G_{21}$, and a plurality of anodes equally distributed along the circumference of a circle and of which the lower anode $A_a$ and the upper anode $A_e$ are shown in the drawing. The impulses $a_e$ corresponding to the first channel are impinged upon the anode $A_a$ and are further amplified by the triode amplifier $T_{25}$ so as to supply the signals $a_{e0}$ of the first signal channel. In a similar manner, the impulses $e_e$ are amplified by the triode amplifier $T_{26}$ and similar amplifiers are provided for the remaining impulse channels.

In order to effect a compensation of the cross-talk voltages according to the invention, there is provided a delay network L consisting of series inductances and shunt capacities in the manner shown. The elements of this delay network are so designed that the impulses of the first channel, for instance, are obtained from the potentiometer $R_1$ during the time when the original impulse voltage $e_0$ already contains the impulses of the next following channel. In an analogous manner, the impulses derived from the potentiometers $R_2$ and $R_3$ are delayed by two or three impulse periods, respectively. The correction device in the example shown includes three transformers through which the delayed correction voltages are applied to the main transmission line. In order to adjust the amplitude of the impulse voltages, the potentiometers $R_1$, $R_2$, $R_3$ are provided. The potentiometer $R_1$ is so adjusted that there is substantially no cross-talk in the various channels at the output of the cathode ray switch originating from the preceding channels. Potentiometer $R_2$ is so adjusted that there is no cross-talk from the first to the third channel, or from the second to the fourth channel. In a similar manner, potentiometer $R_3$ is provided to obtain exact compensation of the cross-talk from the first to the fourth, from the second to the fifth channel, etc.

While there have been shown and described a few desirable embodiments of the invention, it is evident that this disclosure is for the purpose of illustration and that many changes in the arrangement of parts or circuits and substitution of equivalent circuits for those shown may be made, in accordance with the broader scope and spirit of the invention as defined in the oppended claims.

I claim:

1. The combination with a time-division pulse multiplex signalling system of the type including synchronously operating switching devices for transmitting and receiving equi-spaced signal pulses with like-order pulses of successive equal-numbered groups of pulses being modulated in accordance with different modulating signals, to provide a plurality of pulse time signal channels, of means for suppressing cross-talk between adjacent pulse time channels due to distortion caused by flattening of said pulses comprising a main signal path traversed by the distorted multiplex pulse signal, at least one auxiliary signal path, means for applying pulse signal energy from said main signal path to said auxiliary signal path, time-delay means in said auxiliary signal path for producing retarded pulses lagging the respective pulses in said main signal path by a time period equal to the spacing interval between successive pulse time channels of said system, and further means including attenuation means connected between said auxiliary signal path and said main signal path, for re-applying the retarded pulses to said main signal path with such polarity and amplitude, to substantially cancel cross-talk interference from one pulse time channel upon the succeeding channel of said system.

2. The combination with a time-division pulse multiplex signalling system of the type comprising synchronously operating switching means for transmitting and receiving equispaced signal pulses with like-order pulses of successive equal-numbered groups of pulses being modulated in accordance with different modulating signals, to provide a plurality of pulse time signal channels, of means for suppressing cross-talk between adjacent pulse time channels due to distortion caused by flattening of said pulses comprising a main signal path traversed by the distorted multiplex pulse signal, a time-delay network having its input connected to said main signal path and provided with tap connections for deriving a plurality of signal pulses retarded relative to the corresponding pulse in said main path by whole number, including unity, multiples of the spacing interval between successive pulse time channels of said system, and means including attenuation means between each of said tap connections and said main signal path, for re-applying the retarded pulses to said main signal path with such polarity and amplitude, to substantially cancel cross-talk interference from one pulse time channel upon the succeeding channels of said system.

3. The combination with a time-division pulse multiplex signalling system of the type comprising synchronously operating switching means for transmitting and receiving equi-spaced signal pulses with like-order pulses of successive equal-numbered groups of pulses being modulated in accordance with different modulating signals, to provide a plurality of pulse time signal channels, of means for suppressing cross-talk between adjacent pulse time channels due to distortion caused by flattening of said pulses comprising a main signal path traversed by the distorted multiplex signal, an artificial delay line, means for applying pulse signal energy from said main signal path to the input of said line, further means including tap connections from said line for deriving a plurality of signal pulses retarded relative to the respective pulse in said main signal path by whole number, including unity, multiples of the spacing intervals between successive pulse time channels of said system, and further means including adjustable attenuation means connected between said tap connections and said main signal path, for re-applying the retarded pulses to said main signal path with such polarity and amplitude, to substantially cancel cross-talk interference from one pulse time channel upon the succeeding channel of said system.

4. The combination with a time-division pulse multiplex signalling system of the type comprising synchronously operating switching devices for transmitting and receiving equi-spaced signal pulses with like-order pulses of successive equal-numbered groups of pulses being modulated in accordance with different modulating signals, to provide a plurality of pulse time signal channels, means for suppressing cross-talk between adjacent pulse time channels due to distortion caused by a flattening of said pulses comprising a main signal path traversed by the distorted multiplex pulse signal, a plurality of auxiliary signal paths, means for applying pulse signal energy from said main signal path to said auxiliary paths, time delay means in said auxiliary signal paths for producing retarded pulses in each of said auxiliary signal paths lagging the respective pulses in said main signal path by different whole number, including unity, multiples of the spacing intervals between successive pulse time signal channels of said system, and means including attenuation means in each of said auxiliary signal paths for re-applying the retarded pulses from said auxiliary signal paths to said main signal path with such polarity and amplitude, to substantially cancel cross-talk interference from one pulse time channel upon the succeeding channels of said system.

5. The combination with a time-division pulse multiplex signalling system of the type comprising synchronously operating switching devices for transmitting and receiving equi-spaced signal pulses with like-order pulses of successive equal-numbered groups of pulses being modulated in accordance with different modulating signals, to provide a plurality of pulse time signal channels, of compensating means for suppressing cross-talk between adjacent channels due to distortion caused by flattening of said pulses comprising a main signal path traversed by the distorted multiplex signal, at least one auxiliary signal path, means for applying signal energy from said main signal path to the input of said auxiliary signal path, further means for displacing the pulses in said auxiliary signal path relative to the respective pulses in said main signal path by a time interval substantially equal to the spacing interval between successive pulse time channels of said system, and means including attenuation means connected between the output of said auxiliary signal path and said main signal path, for re-applying the displaced pulses to said main signal path with such polarity and amplitude, to substantially cancel cross-talk interference from said channels upon an adjacent channel of said system.

GUSTAV GUANELLA.

REFERENCES CITED

The following references are of record in the file of this patent:

UNITED STATES PATENTS

| Number | Name | Date |
|---|---|---|
| 2,216,545 | Cannon | Oct. 1, 1940 |
| 2,236,134 | Gloess | Mar. 25, 1941 |
| 2,263,369 | Skillman | Nov. 18, 1941 |
| 2,310,692 | Hansell | Feb. 9, 1943 |
| 2,326,584 | Van Zelst | Aug. 10, 1943 |
| 2,408,063 | Greg | Sept. 24, 1946 |
| 2,410,350 | Labin et al. | Oct. 29, 1946 |
| 2,448,635 | Smith | Sept. 7, 1948 |
| 2,450,352 | Piety | Sept. 28, 1948 |

FOREIGN PATENTS

| Number | Country | Date |
|---|---|---|
| 842,357 | France | June 12, 1939 |